United States Patent
Salsman

(10) Patent No.: US 9,346,935 B2
(45) Date of Patent: May 24, 2016

(54) THERMOPLASTIC POLYMER COMPOSITIONS INCLUDING SILICA-CONTAINING NUCLEATING AGENTS

(75) Inventor: Robert Keith Salsman, Hoschton, GA (US)

(73) Assignee: BEAULIEU GROUP, LLC, Dalton, GA (US)

( * ) Notice: Subject to any disclaimer, the term of this patent is extended or adjusted under 35 U.S.C. 154(b) by 1172 days.

(21) Appl. No.: 11/423,245

(22) Filed: Jun. 9, 2006

(65) Prior Publication Data

US 2006/0281851 A1 Dec. 14, 2006

Related U.S. Application Data

(60) Provisional application No. 60/688,759, filed on Jun. 9, 2005.

(51) Int. Cl.
*C08K 3/34* (2006.01)
*D06N 7/00* (2006.01)

(52) U.S. Cl.
CPC ............... *C08K 3/34* (2013.01); *D06N 7/0071* (2013.01); *D06N 2203/061* (2013.01); *D06N 2205/10* (2013.01); *D06N 2209/067* (2013.01); *D06N 2209/1628* (2013.01)

(58) Field of Classification Search
CPC ... C08K 3/34; D06N 7/0071; D06N 2205/10; D06N 2203/061; D06N 2209/1628; D06N 2209/067
USPC ......... 524/492, 69, 59, 68, 425, 423, 427, 95, 524/96, 97; 428/325, 430, 190
See application file for complete search history.

(56) References Cited

U.S. PATENT DOCUMENTS

| | | | | | |
|---|---|---|---|---|---|
| 3,607,615 | A | * | 9/1971 | Hatakeyama et al. | 428/463 |
| 3,624,041 | A | * | 11/1971 | Brandrup et al. | 524/401 |
| 3,673,144 | A | * | 6/1972 | Weissermel et al. | 523/440 |
| 3,765,998 | A | * | 10/1973 | Oswald et al. | 428/338 |
| 3,863,000 | A | * | 1/1975 | Kasai et al. | 264/45.5 |
| 4,051,096 | A | * | 9/1977 | Koseki et al. | 523/215 |
| 4,215,032 | A | * | 7/1980 | Kobayashi et al. | 524/377 |
| 4,234,366 | A | * | 11/1980 | Brewer et al. | 156/79 |
| 4,258,153 | A | * | 3/1981 | Yomamoto et al. | 525/397 |
| 4,629,642 | A | * | 12/1986 | Kernstock | 428/95 |
| 4,705,844 | A | * | 11/1987 | Espenschied et al. | 528/275 |
| 5,504,128 | A | * | 4/1996 | Mizutani et al. | 524/104 |
| 5,578,357 | A | * | 11/1996 | Fink | 428/95 |
| 5,714,224 | A | * | 2/1998 | Gerry | 428/95 |
| 5,763,098 | A | | 6/1998 | Kameoka et al. | |
| 5,804,634 | A | * | 9/1998 | Umetsu et al. | 524/466 |
| 5,834,087 | A | | 11/1998 | Kajikawa et al. | |
| 5,929,145 | A | * | 7/1999 | Higgins et al. | 524/69 |
| 6,258,927 | B1 | * | 7/2001 | Oka et al. | 528/310 |
| 6,274,656 | B1 | * | 8/2001 | Ma et al. | 524/230 |
| 2002/0137832 | A1 | | 9/2002 | Ogoe et al. | |
| 2003/0007990 | A1 | * | 1/2003 | Blankenship et al. | 424/408 |
| 2003/0032707 | A1 | * | 2/2003 | Hemmings et al. | 524/425 |
| 2003/0116752 | A1 | * | 6/2003 | Okamoto et al. | 252/299.64 |
| 2003/0129413 | A1 | * | 7/2003 | Greiner et al. | 428/426 |
| 2006/0134374 | A1 | * | 6/2006 | Bell et al. | 428/97 |

FOREIGN PATENT DOCUMENTS

| | | |
|---|---|---|
| EP | 0386916 A1 | 9/1990 |
| EP | 0634452 A2 | 1/1995 |

OTHER PUBLICATIONS

Richard J. Lewis, Sr. "Hawley's Condensed Chemical Dictionary 13th Edition" John Wiley & Sons, Inc. New York p. 537 (1997).*
a/. L. Andrary, "Plastics and the Environment", John Wiley 7 Sons, Inc, Hoboken . N.J., pp. 420, 430-431,465 (2003).*
Fred W. Billmeyer, Jr, "Textbook of Polymer Science, 3rd Edition" John Wiley & Sons, Inc., New York p. 214 (1984).*
"Webster's Ninth New Collegiate Dictionary", Merriam-Webster Inc. Springfield MA, pp. 1271 (1986).*
Semi-Crystalline Polymer—pp. 1-2, Dec. 24, 2001, RTP Company.*
International Search Rpt, Jul. 31, 2007.
European Search Report issued Jul. 28, 2009, in the corresponding European Application No. 06784733.5.

* cited by examiner

*Primary Examiner* — Alexander Kollias
(74) *Attorney, Agent, or Firm* — McGuireWoods LLP

(57) ABSTRACT

The embodiments disclosed herein relate to thermoplastic polymer compositions that comprise a thermoplastic and nucleating agents, such as silica-containing nucleating agents. The polymer compositions provide improved properties relating to processing, dimensional and thermal stability, improved crystalline structure, and flame retardant properties. The thermoplastic polymer compositions are useful, for example, for carpet backing applications. It is a further feature of the embodiments to provide carpet backing compositions and carpet tiles prepared using the thermoplastic polymer composition, as well as methods of making the carpet tiles.

13 Claims, No Drawings

THERMOPLASTIC POLYMER COMPOSITIONS INCLUDING SILICA-CONTAINING NUCLEATING AGENTS

The present application claims benefit and priority to U.S. Provisional Application No. 60/688,759 filed Jun. 9, 2005.

FIELD OF THE EMBODIMENTS

Embodiments relate to thermoplastic polymer compositions that include nucleating agents whereby the compositions have improved properties for use in carpet backing applications. Non-limiting examples of nucleating agents include silica-containing nucleating agents such as sand, glass, and specifically, ground, powdered, or crushed glass. The polymer compositions provide improved properties relating to processing, dimensional and thermal stability, improved crystalline structure, and flame retardant properties. The polymer compositions are useful, for example, for carpet backing applications.

DESCRIPTION OF RELATED ART

It has long been recognized that filling polymers with inorganic materials can modify the polymer properties. There are a large number of such filled polymers that are used commercially. In many instances, fillers are utilized as much for economics as they are for performance. In some instances, however, fillers can result in improved properties for the underlying composition to which they are added.

Fiberglass reinforced resins have been commercially used for some time.

These are generally thermosetting resins with polyester backbones dissolved or dispersed into a reactive diluent such as styrene that can be cross-linked into rigid or semi-rigid networks. These resins also can be set off with peroxide accelerators. Other resins used in similar applications include acrylics or epoxy polymers, or combinations of the two. Fiberglass reinforced resins typically are used in fabricating bathtubs, shower stalls, boats, boat hulls, and automotive parts.

Other water-soluble or emulsion polymers have been filled with various ingredients to provide a more economical product. In some cases glass has been added to form a roughened surface after the polymer has been dried on the surface. Glass also has been added to provide a decorative finish to wall and floor coverings.

It is important for the polymer or resin to have properties that allow it to "wet" out or bind with the filler. If this "wetting out" property is not achieved, then delamination or failure of the polymer/filler bond can occur. In many instances the polymer can only be loaded with a limited amount of filler before the wetting ability becomes consumed. It then becomes important to add wetting or coupling agents to boost the amount of filler the polymer composition may accept.

The description herein of problems or disadvantages associated with known compositions, compounds, apparatus, and methods is not intended to limit the embodiments to their exclusion. Indeed, various embodiments may include one or more known compositions, compounds, apparatus, and methods without suffering from the previously known problems or disadvantages.

SUMMARY

It is a feature of the embodiments to provide polymer compositions having improved physical properties, and improved processability. It is an additional feature of the embodiments to provide a polymer composition and method of making the polymer composition that has improved properties suitable in carpet backing applications. It is a further feature of the embodiments to provide carpet backing compositions and carpet tiles prepared using the compositions, as well as methods of making the carpet tiles.

In accordance with these and other features of the embodiments, there is provided: a thermoplastic polymer composition comprising a thermoplastic polymer and at least one nucleating agent, whereby the polymer composition may have one or more properties selected from:

an MT4 value of less than about 0.125 and a CT4 value of less than about 0.1, when measured according to the AACHEN Test;
a surface tackiness disappearance time of less than about 1 hour;
a sufficient rigidity time of less than about 75 hours;
a time to ignition of greater than about 13 seconds; and
a time to self-extinguish of less than about 60 seconds.

In accordance with an additional feature of an embodiment, there is provided a thermoplastic polymer composition comprising a thermoplastic polymer and at least finely ground glass powder. Suitable thermoplastic polymers include those that are capable of wetting out large amounts of the ground glass filler. Dispersing agents may be added in some embodiments to allow greater amounts of ground glass fillers to be added to the composition.

Another feature of an embodiment includes a method of making a thermoplastic polymer composition: having one or more of the properties described above, whereby a thermoplastic polymer is admixed with a nucleating agent filler material, the nucleating agent filler material being in an amount of from about 10 to about 70 percent by weights based on the total weight of the thermoplastic polymer composition.

Another feature of an embodiment includes a carpet backing composition comprising the thermoplastic polymer composition described above. An additional feature of an embodiment includes a method of making a carpet backing comprising heating the carpet backing composition, and applying the carpet backing composition to a plurality of carpet backing yarns, carpet cloths, or non-woven fabrics, to form a carpet backing. Suitable methods of making carpet tile backings are disclosed in U.S. Pat. No. 5,834,087, the disclosures of which is incorporated by reference herein in its entirety. The thermoplastic polymer compositions of the invention are suitable in any method of forming a carpet backing for conventional carpet materials, or for carpet tiles.

An additional feature of an embodiment includes a carpet tile comprising the thermoplastic polymer composition described above. These and other features of the embodiments will be readily apparent to those skilled in the art upon review of the detailed description that follows.

DETAILED DESCRIPTION

The terminology used herein is for the purpose of describing particular embodiments only, and is not intended to limit the scope of the present invention. As used throughout this disclosure the singular forms "a," "an," and "the" include plural reference unless the context clearly dictates otherwise. Thus, for example, a reference to "a polymer composition" is a reference to one or more compositions and equivalents thereof known to those skilled in the art, and so forth.

Unless defined otherwise, all technical and scientific terms used herein have the same meanings as commonly understood by one of ordinary skill in the art to which these embodiments belong. Although any methods and materials similar or equivalent to those described herein can be used in the practice or testing of the embodiments, the methods, devices, and materials are now described. All publications mentioned herein are cited for the purpose of describing and disclosing the various components that are reported in the publications and that might be used in connection with the embodiments. Nothing herein is to be construed as an admission that the embodiments are not entitled to antedate such disclosures by virtue of prior invention.

The polymer compositions described herein possess unexpected but highly beneficial increases in dimensional stability that may be achieved by using relatively large amounts of nucleating agents. In one embodiment, these beneficial increases are achieved by utilizing a finely ground glass filler in thermoplastic adhesive and/or layering compositions. This dimensional stability is believed to be important for applications such as backing of carpet tiles where the current art relies primarily on a fiberglass matt to achieve the needed dimensional stability.

While not intending on being bound by any theory of operation, the inventor believes that the finely ground glass filler materials act as a surprising source of nucleation sites in the thermoplastic polymers that are crystalline or semi-crystalline nature. The inventor further believes that smaller particle sizes of the ground glass filler material or other nucleating agent(s), or combinations thereof, contributes to an increased number of nucleation sites. The use of nucleating agents is well documented in industry and typically is described as controlling crystallinity during the application of certain polymers. Controlling the rate and degree of crystallinity is believed to be important in obtaining certain properties in certain applications, such as, for example, where the thermoplastic composition is being used for adhesive purposes.

The nucleating agents described herein also may provide an added benefit to the polymer composition in terms of fire retardancy. Fire retardancy is a desirable property for many polymer applications. Many of the fire retardants used with thermoplastics have the effect of ceramitizing the surface and thus preventing oxygen from getting to the fuel source. Finely ground glass powder has this effect either alone in high concentrations or to augment other flame retardant systems.

The thermoplastic polymer composition includes a nucleating agent and may have one or more properties selected from:
  an MT4 value of less than about 0.125 and a CT4 value of less than about 0.1, when measured according to the AACHEN Test;
  a surface tackiness disappearance time of less than about 1 hour;
  a sufficient rigidity time of less than about 75 hours;
  a time to ignition of greater than about 13 seconds; and
  a time to self-extinguish of less than about 60 seconds.

The thermoplastic composition may have two or more of the properties listed above, and may have three or more, and may even possess all of the aforementioned properties.

Applications of thermoplastics are too numerous to specifically mention in this disclosure. Generally thermoplastics can be used to coat other substrates, as film formers either alone or applied to substrates, as adhesives or adhesive layers, and in forming articles by various molding concepts. The thermoplastic compositions described herein are suitable for use in any or all of these applications.

Fillers typically are added to compositions tot decrease the cost of the composition (e.g., use less polymer by adding fillers that typically are inert). Some filler materials may provide beneficial properties, such as imparting impact resistance, altering the texture or feel of a finished object, etc. Generally, fillers are added to the molten polymer in a number of ways but most frequently they are added into an extruder as a mixture along with pellets of the thermoplastic or downstream in the extruder in a side stuffer. It may be beneficial to add these fillers in a very carefully controlled environment and at a higher level than the end product requires, pelletize, and then mix the pellets with non-filled thermoplastic in an extruder again to produce a final product composition. In this regard, the filled resin could be called a "Masterbatch."

Additional methods of providing fillers to thermoplastic polymers involve a batch process further upstream in the vessel in which the polymer itself is made. In these cases, the filler can be added to a vessel or reactor directly into the molten polymer. The composition may be agitated until the composition in thoroughly mixed and then the mixture is either applied directly or extruded into pellets, pillows, bricks, etc. for further processing.

Suitable thermoplastics for use in the embodiments include, for example, any known thermoplastic polymer material. Suitable thermoplastics include esters of polyethylene terephthalate (PET), optionally with a modifying polymer, esters of polyethylene naphthalate (PEN), optionally with a modifying polymer other polyester materials, polyesters (all copolymers), polyamides (all copolymers), ethylene vinyl acetates and polyethylene copolymers, polyolefins, polystyrenes, polystyrene butadienes, acrylonitrile butadiene styrene and copolymers, polyvinyl chloride, acrylics, styrene maleic acrylics, acetal, fluoropolymers and copolymers, polybutylene, polycarbonate, polyimides and polyetherimides, polysulfones, and polyethersulfones, polyvinylindene chlorides, silicones, and mixtures and combinations thereof. The optional modifying polymer, for example, may be one or more of polyethylene glycol, diethylene glycol, trimethylol propane, phthalic anhydride, adipic acid, and combinations or mixtures thereof. Additionally, esterification catalysts may be added to the mixture in order to promote esterification of the modifying polymers and trans-esterification with PET and PEN.

The thermoplastic polymer may be mixed with additives to impart additional beneficial qualities to the finished carpet. Applicable additives include, but are not limited to, fire retardants, fillers, weighters, oxidization stabilizers, antibacterial agents, antimicrobial agents, antifungal agents, UV stabilizers, and combinations or mixtures thereof. One skilled in the art will recognize other applicable additives that may optionally be added to the hot melt adhesive, in accordance with the guidelines provided herein.

One filler suitable for use in the embodiments is a nucleating agent that is capable of imparting one or more of the properties described above to the polymer composition. For example, a finely ground glass material or other silica-containing nucleating agent may be added to the thermoplastic polymer composition. These fillers include powdered glass, powdered sand, powdered quartz, powdered silica-containing ceramics, and the like. The filler can be added in an amount of from about 10 to about 70 weight percent, based on the total weight of the polymer composition, or it may be added in an amount of from about 40 to about 60 weight percent. The filler may have a mesh size of about 40 to about 250 mesh, or from about 50 to about 70 mesh.

The thermoplastic polymer compositions described herein may be used in carpet tile backing applications, where a meltable composition is desirable. The composition can be applied to any known carpet backing material to provide a carpet backing having improved dimensional stability, improved fire retardance, and other desirable properties described herein. For example, the thermoplastic polymer composition can have a relatively lower viscosity when melted so that it may more fully penetrate the fiber tufts of the greige carpet typically used for carpet backings. The thermoplastic polymer compositions described herein may have a viscosity of less than 300,000 centipoise at 325° F., or the composition could have a viscosity of less 75,000 centipoise at 325° F.

The thermoplastic composition described herein may be applied to the secondary backing material or primary backing material to form the carpet backing. Applying the thermoplastic composition to the carpet backing material may take place in any applicable manner. For example, the thermoplastic composition may be sprayed or rolled on the carpet backing material, or it may be applied in one application, or multiple applications to provide a multi-coated carpet backing material.

EXAMPLES

Example 1

In the carpet industry, thermoplastic materials have been and are being used as a suitable adhesive layer for adhering tufts into a backing material. In this regard, they are applied to the back of the carpet onto the tufts protruding through the primary backing. Various materials have been used to achieve this, but more recently polyesters have been used. The polyester materials have the ability to wet out and adhere to the tufts providing both internal and external binding. To provide increased weight and improved economics, various fillers have been tried, some with marginal success.

In the batch process using thermoplastic polyester, finely ground glass powder of 60 mesh size or less was added to the finished polymer at levels of 10 to 70 percent, or from 40 to 60 percent prior to application on the carpet back. It was found to provide properties that none of the other previously tried fillers had, and even more so the resulting composition had a combination of properties not believed to have been previously achieved using conventional fillers and polymers. These properties provide the following added benefits.

Improved processing due to the flow properties of the thermoplastic composition allows for slight changes in running conditions without affecting the final product. Some of these flow properties can be attributed to the internal heat sinking effect of the composition containing the glass. The specific heat of the polymer/glass composition is believed to be considerably more than that of the polymer alone.

Example 2

Dimensional Stability

This property was measured using a test for carpet tile dimensional stability called the AACHEN test. In this method the carpet is subjected to a series of conditions that mimic the action of steam, moisture, and heat on the carpet tile. The results are provided in table 1 below:

TABLE 1

| DESCRIPTION | AACHEN TEST VALUES-Average |
|---|---|
| Control = 50% Polyester/50% Magnetite filler with Fiberglass Matt | MT4 = .127 CT4 = .052 |
| 50% Polyester MHF/50% Magnetite filler with no Fiberglass Matt | MT4 = .295 CT4 = .102 |

TABLE 1-continued

| DESCRIPTION | AACHEN TEST VALUES-Average |
|---|---|
| 50% Polyester MHF/50% Barium Sulfate filler with no Fiberglass Matt | MT4 = .262 CT4 = .181 |
| 50% Polyester MHF/50% Ground Glass Powder with no Fiberglass Matt | MT4 = .123 CT4 = .071 |

The results in the table above reveal that the polymer compositions of the embodiments provide a carpet back with improved dimensional stability, and in fact can provide the same or better dimensional stability as carpet backings that utilize a fiberglass matt. Thus, embodiments of the carpet backing may not include a fiberglass matt, yet still possess the requisite dimensional stability, thereby reducing carpet backing costs and processing time.

Example 3

Controlled Nucleation of Polyester Formula

It was found during the processing of the polyester carpet backing that the crystallinity of the polyester may have had a significant influence on the properties of the finished carpet. If the crystallinity was too high initially then the desirable properties of tuft bond strength and Velcro fiber stability may have suffered. If the crystallinity was not high enough, then the carpet backed surface may have become too tacky resulting in numerous processing problems including, but not limited to blocking, fiber transfer, excessive drape, and dimensional stability as in above example. Using the guidelines provided herein, those skilled in the art will be capable of modifying the thermoplastic polymer composition to have the requisite crystallinity, depending on the particular application of the polymer composition.

Two test parameters were used in the following table 2. These parameters were surface tackiness after application and backing rigidity, both of which are believed to be directly related to polymer crystallinity. The addition of the ground glass powder resulted in the ability to control these parameters more sufficiently.

TABLE 2

| Formulation | Running Temperature | Time to disappearance of surface tackiness | Time to sufficient rigidity |
|---|---|---|---|
| Polyester MDF/Magnetite 50/50 | 330° F. | ~30 hours | ~168 hours |
| Polyester MHF/Magnetite 50/50 | 330° F. | ~24 hours | ~120 hours |
| Polyester MHF/Magnetite 50/50 | 350° F. | ~12 hours | ~120 hours |
| Polyester MHF/Barium Sulfate 50/50 | 330° F. | ~12 hours | ~96 hours |
| Polyester MHF/Calcium Carbonate 50/50 | 330° F. | ~5 hours | ~96 hours |
| Polyester MHF/Ground Glass 50/50 | 330° F. | ~3 minutes | ~60 hours |
| Polyester MHF/Ground Glass 50/50 | 350° F. | ~5 minutes | ~48 hours |

In this example the ground glass is apparently offering numerous sites for crystallinity to initiate, and consequently, is behaving as a nucleating agent.

Example 4

It was also found that glass filled compositions offered flame retardant properties greater than the thermoplastic polyester formulation alone or thermoplastic polyester formulations filled with other known fillers. Two properties were tested. These properties were time to initial ignition when exposed to a torch flame and time for the ignition to self-extinguish once the torch flame was removed. It was determined that these two properties related well to the Radiant Panel Carpet Test that is used to standardize flame retardancy in the carpet industry. The results are listed in table 3 below:

TABLE 3

| Formulation | Time to Ignition | Time to Self-Extinguish |
| --- | --- | --- |
| Polyester Polymer MDF-100% | 10 seconds | <1 minute |
| Polyester Polymer MHF-100% | 15 seconds | <1 minute |
| Polyester Polymer MHF/Calcium Carbonate 50/50 | 15 seconds | <1 minute |
| Polyester Polymer MHF/Ground Glass 90/10 | 15 seconds | <1 minute |
| Polyester Polymer MHF/Ground Glass 80/20 | 15 seconds | <1 minute |
| Polyester Polymer MHF/Ground Glass 70/30 | 22 seconds | 30 seconds |
| Polyester Polymer MHF/Ground Glass 60/40 | 33 seconds | 10 seconds |
| Polyester Polymer MHF/Ground Glass 50/50 | 40 seconds | 2 seconds |

From these data it is clear to see that the effect of ground glass, especially in the higher loading levels, sufficiently increases the flame retardancy of the thermoplastic polymer. It was especially interesting that the char formation on the surface seemed to be much harder indicating that a least some melting and subsequent ceramitizing of the surface was occurring.

Other embodiments, uses, and advantages of the embodiments will be apparent to those skilled in the art from consideration of the specification and practice of the embodiments disclosed herein. The specification should be considered exemplary only, and the scope of the embodiments is accordingly not intended to be limited thereby.

What is claimed is:

1. A carpet or carpet tile comprising:
a backing material which comprises a plurality of carpet backing yarns, carpet cloths or non-woven fabrics; and
a carpet backing composition applied to the backing material and consisting of:
at least one thermoplastic polyester that is crystalline or semi-crystalline in nature and is present in the composition in an amount from 40 weight percent to 60 weight percent based on the total weight of the composition; and
a nucleating agent providing nucleation sites therefor and that is ground glass, crushed glass, or mixtures or combinations thereof,
wherein the nucleating agent having has a particle size from about 40 mesh to about 250 mesh, and the nucleating agent is present in the carpet backing composition in an amount greater than 40 weight percent and up to about 60 weight percent based on the total weight of the carpet backing composition,
wherein the carpet backing composition has at least one of the properties selected from the group consisting of an MT4 value of less than about 0.125 and a CT4 value of less than about 0.1, when measured according to the AACHEN Test, a surface tackiness disappearance time of less than about 1 hour, a time to backing rigidity of less than about 75 hours, a time to ignition of greater than about 13 seconds, and a time to self-extinguish of less than about 60 seconds.

2. The carpet or carpet tile of claim 1, wherein the nucleating agent has a mesh size of about 50 to about 70 mesh.

3. The carpet or carpet tile of claim 1, wherein the nucleating agent has a mesh size from about 40 mesh to about 60 mesh.

4. The carpet or carpet tile of claim 1, wherein the carpet backing composition has a viscosity of less than 300,000 centipoise at 325° F.

5. The carpet or carpet tile of claim 1, wherein the carpet backing composition has a viscosity of less than 75,000 centipoise at 325° F.

6. The carpet or carpet tile of claim 1, wherein the at least one thermoplastic polyester is selected from the group consisting of esters of polyethylene terephthalate (PET), esters of polyethylene naphthalate (PEN) and combinations thereof.

7. The carpet or carpet tile of claim 1, wherein the nucleating agent is present in the carpet backing composition in an amount of about 50 weight percent based on the total weight of the carpet backing composition.

8. A carpet or carpet tile comprising:
a backing material which comprises a plurality of carpet backing yarns, carpet cloths or non-woven fabrics; and
a carpet backing composition applied to the backing material and comprising a thermoplastic polyester that is crystalline or semi-crystalline in nature, and
a nucleating agent providing nucleation sites therefor and that is ground glass, crushed glass, or mixtures or combinations thereof,
wherein the thermoplastic polyester is present in the composition in an amount from 40 weight percent to 60 weight percent based on the total weight of the carpet backing composition, w
herein the nucleating agent has a size from about 40 mesh to about 60 mesh, and the nucleating agent is present in the composition in an amount greater than 40 weight percent and up to 60 weight percent, based on the total weight of the carpet backing composition,
wherein the carpet backing composition, in the absence of a fiberglass matt, has an MT4 value of less than about 0.125 and a CT4 value of less than about 0.1, when measured according to the AACHEN Test.

9. The carpet or carpet tile of claim 8, wherein the carpet backing composition further comprises a dispersing agent.

10. The carpet or carpet tile of claim 8, wherein the carpet backing composition further comprises an additive selected from the group consisting of fire retardants, fillers, weighters, oxidization stabilizers, antibacterial agents, antimicrobial agents, antifungal agents, UV stabilizers, and combinations thereof.

11. A method of making a carpet backing for a carpet or carpet tile comprising:
providing a backing material comprising a plurality of carpet backing yarns, carpet cloths or non-woven fabrics;
admixing a thermoplastic polyester that is crystalline or semi-crystalline in nature, and
a nucleating agent that is ground glass, crushed glass, or a combination of the ground or crushed glass, to form a carpet backing composition,
wherein the thermoplastic polyester is present in the composition in an amount from 40 weight percent to 60 weight percent based on the total weight of the carpet backing composition, wherein the nucleating agent has a particle size from about 40 mesh to about 60 mesh, and the nucleating agent is present in the composition in an amount of greater than 40 weight percent and up to about 60 weight percent, based on the total weight of the carpet backing composition;

heating the carpet backing composition to a temperature such that the carpet backing composition has a viscosity of less than 300,000 centipoise at 325° F.; and applying the carpet backing composition to the backing material to form a carpet backing for a carpet or carpet tile.

12. The method of claim 11, wherein the carpet backing composition, in the absence of a fiberglass matt, has an MT4 value of less than about 0.125 and a CT4 value of less than about 0.1, when measured according to the AACHEN Test.

13. The method of claim 11, wherein the carpet backing composition is heated to a temperature such that the composition has a viscosity of less than 75,000 centipoise at 325° F.

* * * * *